United States Patent
Noe et al.

(10) Patent No.: US 8,403,009 B2
(45) Date of Patent: Mar. 26, 2013

(54) METHOD AND DEVICE FOR FILLING CONTAINERS

(75) Inventors: Joachim Noe, Ehingen (DE); Thomas Ruelker, Dresden (DE); Ralf Heim, Laupheim (DE)

(73) Assignee: Uhlmann Pac-Systems GmbH & Co. KG, Laupheim (DE)

( * ) Notice: Subject to any disclaimer, the term of this patent is extended or adjusted under 35 U.S.C. 154(b) by 898 days.

(21) Appl. No.: 12/538,523

(22) Filed: Aug. 10, 2009

(65) Prior Publication Data

US 2010/0037981 A1     Feb. 18, 2010

(30) Foreign Application Priority Data

Aug. 13, 2008  (EP) ..................................... 08014446

(51) Int. Cl.
*B65B 3/04* (2006.01)
(52) U.S. Cl. ............. 141/167; 141/1; 141/179; 141/184
(58) Field of Classification Search .................. 141/1, 2, 141/167, 178–179, 183–185
See application file for complete search history.

(56) References Cited

U.S. PATENT DOCUMENTS

| 2,753,099 | A | * | 7/1956 | Jenner et al. ..................... 177/52 |
| 3,871,509 | A | * | 3/1975 | Kuster et al. .................. 141/167 |
| 5,168,905 | A | * | 12/1992 | Phallen ............................ 141/1 |
| 5,713,180 | A | * | 2/1998 | Lewis ............................ 53/253 |
| 5,718,102 | A | * | 2/1998 | Draghetti ........................ 53/444 |
| 6,390,272 | B1 | * | 5/2002 | Tsutsui ....................... 198/343.1 |
| 6,419,076 | B1 | * | 7/2002 | Tsutsui ......................... 141/179 |
| 6,755,223 | B1 | * | 6/2004 | Trebbi et al. ................... 141/144 |
| 7,278,531 | B2 | * | 10/2007 | Hartness et al. ........... 198/470.1 |
| 7,299,832 | B2 | * | 11/2007 | Hartness et al. .............. 141/144 |
| 2008/0307750 | A1 | * | 12/2008 | Noe et al. ..................... 53/284.5 |

FOREIGN PATENT DOCUMENTS

| DE | 21 30 944 | | 1/1972 |
| DE | 37 24 839 | | 2/1989 |
| DE | 103 56 073 | | 7/2005 |
| EP | 2154073 | A1 * | 2/2010 |
| GB | 2 178 015 | | 2/1987 |

* cited by examiner

*Primary Examiner* — Gregory Huson
*Assistant Examiner* — Nicolas A Arnett
(74) *Attorney, Agent, or Firm* — Cozen O'Connor

(57) ABSTRACT

A method for filling a plurality of containers in cycles at a predetermined number of stationary filling units arranged in a row with a first spacing from each other. The method includes providing a plurality of positively guided containers in a row, one-by-one, wherein the containers have a uniform second spacing from each other, wherein the first spacing of the individual filling units is a whole-number multiple of the second spacing of the containers, and filling a predetermined number of the containers simultaneously at the filling units. The containers are shifted in cycles along the filling units in a transport direction by a step length, which is a whole-number multiple of the second spacing of the containers and which is shorter than a third spacing between a first filling unit and a last filling unit steps of filling and shifting are repeated over a predetermined number of iterations.

11 Claims, 4 Drawing Sheets

| | Position 1-5 | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| z | 1 | | 2 | | 3 | | 4 | | 5 | | | | | | | | | | | | | | | | | | | | | |
| 0 | 9 | 8 | 7 | 6 | 5 | 4 | 3 | 2 | 1 | | | | | | | | | | | | | | | | | | | | | |
| 5 | 14 | 13 | 12 | 11 | 10 | 9 | 8 | 7 | 6 | 5 | 4 | 3 | 2 | 1 | | | | | | | | | | | | | | | | |
| 5 | 19 | 18 | 17 | 16 | 15 | 14 | 13 | 12 | 11 | 10 | 9 | 8 | 7 | 6 | 5 | 4 | 3 | 2 | 1 | | | | | | | | | | | |
| 5 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | | | | | | |
| 5 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |

| | | | | Position 1-5 | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|
| | 1 | | | 2 | | | 3 | | | 4 | | | 5 | | | | | | | | | | | | | | | | | | | | | | |
| z | | | | | | | | | | | | | | | | | | | | | | | | | | | | | | | | | | | |
| 0 | 13 | 12 | 11 | 10 | 9 | 8 | 7 | 6 | 5 | 4 | 3 | 2 | 1 | | | | | | | | | | | | | | | | | | | | | | | |
| 5 | 18 | 17 | 16 | 15 | 14 | 13 | 12 | 11 | 10 | 9 | 8 | 7 | 6 | 5 | 4 | 3 | 2 | 1 | | | | | | | | | | | | | | | | | | |
| 5 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | | | | | | | | | | | | | |
| 5 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | | | | | | | | |
| 5 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | | | |

Fig. 4

METHOD AND DEVICE FOR FILLING CONTAINERS

BACKGROUND OF THE INVENTION

1. Field of the Invention

The present invention pertains to a method and to a device for filling a plurality of containers in cycles, especially for use in the packaging of pharmaceutical products.

2. Description of the Related Art

These types of devices have been used for many years, and in the pharmaceutical industry they serve, for example, to fill bottles or tins with tablets. In the standard case, a conveyor belt or screw conveyor, moving in cycles, is used, which carries the containers to be filled to stationary filling stations and takes them away again. Examples of these types of filling devices are known from EP 1 035 023 A1 and WO 2006/016268 A1.

So that the highest possible throughput can be achieved during production and so that there is no need to interrupt the continuous transport of the containers before and after they have been filled as described above, the containers to be filled can be transferred to an intermediate storage unit, which operates in cycles and thus makes it possible for the filling operation to take place in stationary filling stations.

A device in which the products being supplied continuously on a one-by-one basis are collected and stored and can be taken from it again in groups in a cycled manner is known from DE 37 24 839 C2. This known device comprises an endless conveyor chain traveling around two rotatably supported deflecting pulleys mounted a fixed distance apart, the chain being provided with compartment-forming drivers to accept and to transport the products being supplied one-by-one. It also comprises a slide, on which the two deflecting pulleys are mounted.

With the help of the device known from DE 37 24 839 C2, it is possible for example, to fill an entire group of supplied bottles with tablets simultaneously at the stationary filling stations. For this purpose, the bottles conveyed one-by-one by a conveyor belt are transferred to the endless conveyor chain. The group of bottles which has been moved up to the stationary filling stations is held in the filling position for the duration of the filling operation by a translational movement of the slide in the direction opposite that of the endless conveyor chain, and after the bottles have been filled, the slide is moved by the same distance as that which it traveled during the filling operation in order to carry away the group of bottles now filled with tablets and to bring the next group of bottles to be filled into the filling position.

The disadvantage of this is that the group of bottles already filled with tablets undergoes considerable acceleration as a result of the rapid translational movements of the slide and of the endless conveyor chain, which are both moving in the same direction and the speeds of which are therefore additive. As a result, it is possible for centrifugal force to cause individual tablets to fall out of the filled but as yet unsealed bottles. There is thus the risk that the number of tablets which should be present according to the production quality standard is no longer the same as the number of tablets actually present. The quality characteristics defined for the filling process therefore cannot be maintained.

SUMMARY OF THE INVENTION

It is an object of the present invention to provide an improved method for filling a plurality of containers in cycles, namely a method which is robust, relatively simple, and not susceptible to breakdown, which conveys the filled containers onward without loss of content, and which thus contributes to an increased level of process stability and quality. It is also an object of the invention to provide a corresponding device.

According to an aspect of the invention, the method for filling a plurality of containers in cycles at a predetermined number x of stationary filling units $F_1, F_2, \ldots, F_x$ arranged in a row and with a first spacing y between them comprises the following steps:

(a) providing a plurality of positively guided containers in a row, one-by-one, wherein the containers have a uniform second spacing d from each other, and wherein the first spacing y of the individual filling units $F_1, F_2, \ldots, F_x$ is a whole-number multiple of the second spacing d of the containers, (b) filling a predetermined number x of containers simultaneously at the filling units $F_1, F_2, \ldots, F_x$, (c) shifting the containers in cycles along the filling units in a transport direction by a step length z, which is a whole-number multiple of the second spacing d of the containers and which is shorter than a third spacing $(x-1)*y$ between a first filling unit $F_1$ and a last filling unit $F_x$, and (d) repeating steps (b) and (c) over a predetermined number of iterations.

According to another aspect of the invention, a device is provided for filling a plurality of containers with pharmaceutical products in cycles, which containers are positively guided on a one-by-one basis and are arranged with a uniform second spacing d from each other, the device comprising:

a predetermined number x of stationary filling units arranged in a row with a first spacing y from each other, a first conveyor device for moving the containers along the filling units in a transport direction in cycles by a step length z, which is a whole-number multiple of the second spacing d of the containers, and which is shorter than a third spacing $(x-1)*y$ between a first filling unit and a last filling unit, and a control unit, which is suitable for controlling, in a coordinated manner, the filling of the containers and the movement of the containers in cycles by the step length z by the first conveyor device.

By means of the method and the device according to the invention, the travel distances are reduced, and accordingly the acceleration of the filled containers is decreased without any negative effect on the filling capacity of the process. The probability that the bulk product already in a container can escape from the container as a result of its rapid movement is therefore significantly reduced. This guarantees in turn that the filling operation can achieve a very high level of quality.

The number x of filling units $F_1, F_2, \ldots, F_x$ may be odd, and the step length z corresponds to the second spacing d of the containers multiplied by the number x of filling units $F_1, F_2, \ldots, F_x$. The control is very simple because of the constant step length and can be realized by simple means.

In another embodiment the number x of filling units $F_1, F_2, \ldots, F_x$ is even and the step length z corresponds alternately to the second spacing d of the containers multiplied by the number x of filling units $F_1, F_2, \ldots, F_x$ minus 1 and the second spacing d of the containers multiplied by the number x of filling units $F_1, F_2, \ldots, F_x$ plus 1, either in this order or in the reverse order. In this way, the method and the device can be adapted relatively easily to the preexisting units of a filling plant, so that there is no need to rebuild it or to reduce its filling capacity.

The device according to the invention preferably comprises a second and third conveyor device for the continuous, positively guided movement of the containers, each of which comprises at least one screw conveyor, wherein the second conveyor device transfers the containers to the first conveyor device and the third conveyor device accepts the containers from the first conveyor device. Thus the device can be integrated into a production process chain which operates continuously under long-term operating conditions.

It is also advantageous for the first conveyor device to be designed as a slide, which moves slowly by a translational movement in the direction opposite the transport direction during the filling operation and then moves faster in the transport direction to move the containers in cycles.

It is preferable to combine the movement of the containers around the slide with the translational movement of the slide under the control of the control unit.

The first transport device preferably comprises an endless traveling belt with drivers. The belt is deflected around belt pulleys, which are mounted on the slide.

In the transfer area between the second and first conveyor devices and also in the transfer area between the first and third conveyor devices, a star wheel with holders is preferably provided for the positively guided reversal of direction of the individual containers.

The advantage of the device according to the invention consists primarily in that the speed at which the filled containers move can be significantly reduced, i.e., by at least half, as a result of the decrease in the distance which they must travel. As a result, the acceleration is also decreased and thus also is the probability that tablets, for example, could fall out of the filled containers as a result of the centrifugal forces which occur over the conveying distance. At the same time, the method according to the invention guarantees that the filling capacity or overall output of the device in the process chain is not impaired. Overall, therefore, a more stable and higher-quality filling operation is achieved.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further details, features, and advantages of the present invention can be derived from the following detailed description, based on the drawings:

FIG. 2 is a schematic diagram of a method for filling a plurality of containers in cycles, wherein the number of filling units is odd;

FIG. 3 is a schematic diagram of a method for filling a plurality of containers in cycles, wherein the number of filling units is even; and FIG. 4 is a schematic diagram of a method for filling a plurality of containers in cycles, wherein the number of filling units is odd and their spacing is equal to three times the spacing of the containers.

DETAILED DESCRIPTION OF THE PRESENTLY PREFERRED EMBODIMENTS

Figure 1:
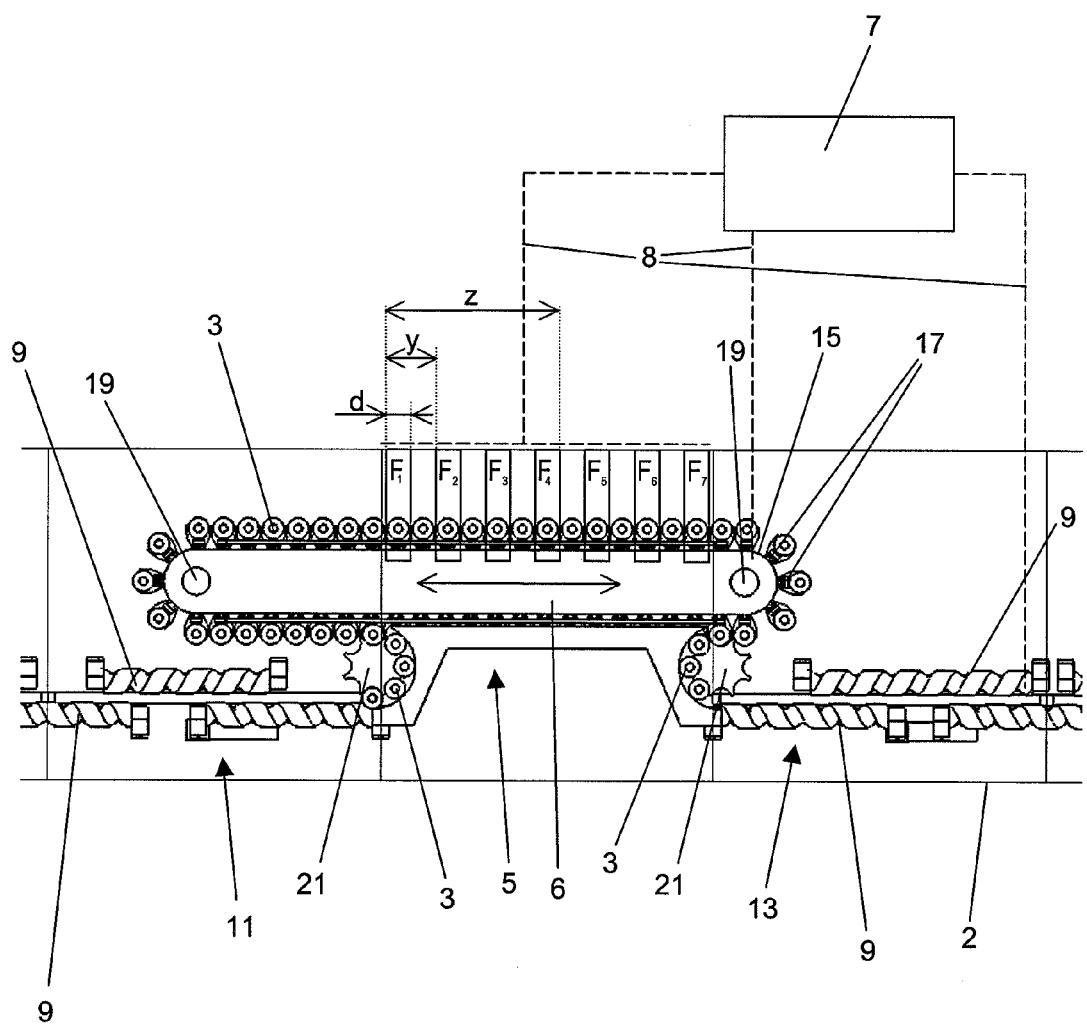
FIG. 1 is a top view of a preferred embodiment of a device for filling in cycles a plurality of containers positively guided one-by-one.

FIG. 1 is a top view of a preferred embodiment of the device according to the invention for filling in cycles of a plurality of containers positively guided one-by-one. The device of the preferred embodiment shown in FIG. 1 represents a portion of a plant for filling bottle-like or tin-like containers with pharmaceutical products.

In the intake area inside a housing 2 shown on the left in FIG. 1, a second conveyor device 11 uses screw conveyors 9 to guide the containers 3 being supplied continuously one-by-one from the left to a first conveyor device 5. In the discharge area (on the right in FIG. 1), the containers 3 are transferred from the first conveyor device 5 to the third conveyor device 13, which also comprises screw conveyors 9. In the transfer area between the second conveyor device 11 and the first conveyor device 5 and between the first conveyor device 5 and the third conveyor device 13, there is in each case a star wheel 21 with holders for the positively guided reversal of the direction of the individual containers 3. The screw conveyors 9 preferably run continuously at the same speed.

Also inside the housing 2 are seven stationary filling units $F_1$ to $F_7$, arranged next to each other in a row. They are located at the upper edge of the housing 2 in the diagram of FIG. 1. They are all spaced equally apart by the first spacing y.

The first conveyor device 5 comprises a slide 6, which can be moved in the transport direction in translational fashion along the row of filling units $F_1$ to $F_7$ (as indicated by the double arrow). An endless belt 15, which comprises drivers 17 for the containers 3, travels around the slide 6. On the long sides of the slide 6, the containers 3 located in the drivers 17 are spaced apart by the second spacing d. The endless traveling belt 15 is deflected around the belt pulleys 19, which are mounted on the slide 6.

A control unit 7 controls the operation of the entire device and is for this purpose connected to the filling units $F_1$ to $F_7$, to the first conveyor device 5, and to the screw conveyors 9 by control lines 8. As previously mentioned, the second conveyor device 11 and the third conveyor device 13 are controlled by the control unit 7 in such a way that the containers 3 are brought in and carried away one-by-one at the same speed. The drivers 17 of the endless belt 15 traveling around the slide 6 accept the containers 3, which have been supplied one-by-one by a first star wheel 21; in the diagram of FIG. 1, these containers are then guided toward the left. At the left belt pulley 19, the direction in which the individual containers 3 travel is reversed, and after this reversal they are arranged in a row parallel to the row of the filling devices $F_1$ to $F_7$, where they can now be filled. The filled containers 3 are then deflected around the right belt pulley 19 and then transferred by the right star wheel 21 to the third conveyor device 13.

So that the containers 3 on the long side of the first conveyor device 5 in the area of filling units $F_1$ to $F_7$ are not conducted past the filling units $F_1$ to $F_7$ at the continuous intake speed but are instead held essentially stationary in alignment with the filling units $F_1$ to $F_7$ during the filling period and can thus be filled, the slide 6 moves relatively slowly in the direction opposite the transport direction (toward the left in FIG. 1) during the filling period. Simultaneously, the belt 15 moves in the clockwise direction at a speed which corresponds to the translational speed of the slide 6. As a result of the superimposition of the two movements, the containers 3 remain stationary on the side facing the filling units $F_1$ to $F_7$ during the filling period. On the other side of the slide 6, on which the star wheels 21 are located, conversely, the two movements are superimposed in such a way that the containers 3 are accepted and carried onward at precisely the continuous intake and discharge speed of the screw conveyors 9.

During the interval in which no filling operation is taking place, the slide 6 moves quickly in the transport direction (toward the right in FIG. 1) and thus moves the previously stationary containers 3 located in front of the filling units $F_1$ to $F_7$ further onward in the transport direction and the next group of unfilled containers 3 into the filling position. At the same time, the belt 15 mounted on the slide 6 moves much more quickly in the clockwise direction than before. The speed at which the belt 15 now travels is, in terms of its absolute value, faster than the translational speed of the slide 6 in the transport direction by an amount equal to the speed of the screw conveyors 9. Thus the rapid movement of the containers 3 on the side where the filling units are arranged is produced by the combination of the translation of the slide 6 and the traveling movement of the belt 15, wherein the speed of the belt 15 accounts for the larger share. The translational displacement of the slide 6 is therefore less than half the actual step length z (see below) of a container 3.

A first conveyor device 5 designed in this way to move the containers 3 in cycles in the area of the filling units can thus be combined with the continuous intake and discharge movements of the second and third conveyor devices 11, 13.

A feature which applies during the entire course of the process is that, at the star wheels 21, that is, at the transfer points from the continuously running first conveyor device 11 to the belt 15 traveling around the slide 6 and from the belt 15 to the continuously running second conveyor device 13, the absolute speed of the drivers 17 is constant and, in terms of absolute value, equal to the speed of the second and third conveyor devices 11, 13 although, of course, the drivers are traveling in the opposite direction to the conveyors. As a result, the containers 3 can be loaded into the first conveyor device 5 and unloaded from it continuously.

During the filling operation, furthermore, the containers 3 on the filling side do not move in front of the filling units $F_1$ to $F_7$ in an absolute sense, whereas during the intervals between the filling operations, they move, in an absolute sense, at twice the speed of the slide 6 plus the speed of the second and third conveyor devices 11, 13.

The crucial point of the present invention is that the containers 3 on the filling side do not move at this fast forward speed over the entire "filling length", which, in the embodiment shown here, is equal to 7*y. On the contrary, they move at a fast-forward speed over only a fraction of that distance. This offers the advantage that the filled containers 3 are not accelerated very much during the interval between filling operations, for which reason the probability that, for example, tablets already loaded into the containers 3 can escape from the containers under the action of centrifugal force is considerably decreased.

In the embodiment shown here, the number of filling units $F_1$ to $F_7$ is seven, and the absolute step length z, by which the containers 3 are moved forward in cycles in the transport direction, is exactly seven times the second spacing d of the containers 3. Thus the containers 3, the second spacing d of which is equal to exactly half of the first spacing y of the filling units $F_1$ to $F_7$, are filled in a staggered manner; that is, in the embodiment shown here, every second container 3 is filled. The containers are then moved onward by the step length $z=7*d$, wherein the empty containers 3, i.e., those located next to the already filled containers 3, are then filled.

FIG. 2 is a schematic diagram of the filling operation in a preferred embodiment of the device according to the invention. The number of filling units here is five, an odd number. It can be seen that the first spacing y of two adjacent filling units, as also in the case of the embodiment shown in FIG. 1, is twice the second spacing d of the individual containers:

$y=2*d$. In the first line underneath the black filling units, designated by their positions 1-5, the containers, illustrated as "boxes", are numbered sequentially 1-9 from right to left. Containers 1, 3, 5, 7, and 9, which have been filled during the first filling operation, appear gray in the diagram. After the filling operation, the entire row of containers is cycled onward. The position after the first cycled movement by the step length $z=5*d$ is shown in the second line underneath the filling units. It can be seen that the second filling operation results in filling the containers numbered 6, 8, 10, 12, and 14. The containers numbered 2 and 4 remain empty in the embodiment shown here. After the second filling operation, the entire row of containers is again shifted onward by the step length $z=5*d$. In the third line, it can now be seen that the containers 11 and 13, which were still empty in the second line, are now filled in positions 4 and 5 together with containers 15, 17, and 19. The fourth and fifth lines, each of which has also been shifted by the step length $z=5*d$, show clearly that all of the containers in the row, with the exception of the above-mentioned containers 2 and 4, are filled. Optimal utilization of the filling device is thus guaranteed.

Figure 3:
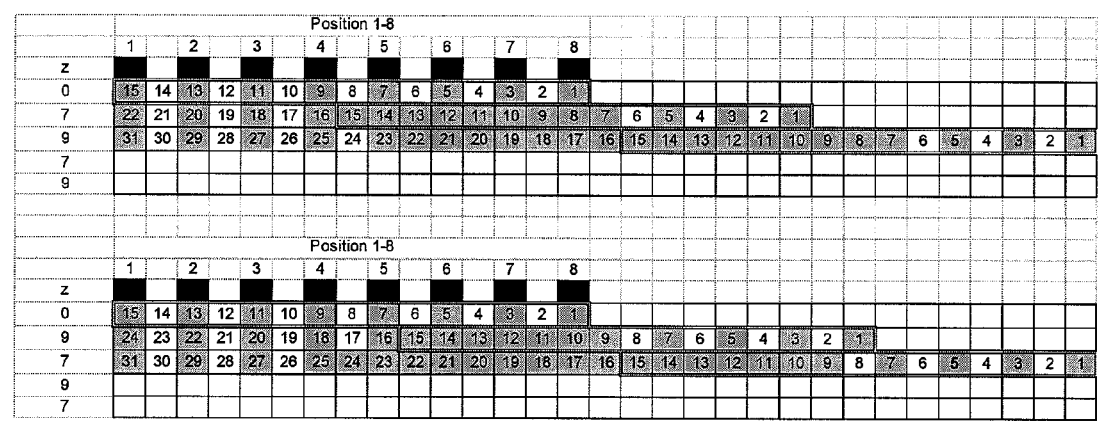

FIG. 3 shows two schematic diagrams, similar to that of FIG. 2, of an additional preferred embodiment of the present invention. In both diagrams, the number of filling units is even, namely, 8 in both cases. In the first line of the two diagrams, containers 1-15 are located under filling positions 1-8, where the containers 1, 3, 5, 7, 9, 11, 13, and 15 are filled.

In the upper diagram, the containers are then shifted first to the right by the step length $z=7*d$, so that the containers numbered 8, 10, 12, 14, 16, 18, 20, and 22 are positioned under the filling units numbered 1-8 and can thus be filled. The step length z here, therefore, is $(8-1)*d=7*d$. So that, during the next filling operation, the containers not filled so far can also be filled, the containers must be shifted quickly during the interval between fillings by nine container positions. In the third line of the diagram, it can be seen that the containers numbered 17, 19, 21, 23, 25, 27, 29, and 31 arrive under filling positions 1-8 and can now be filled. In the third line, the step length z is therefore $(8+1)*d=9*d$. So that a row of continuously filled containers without gaps is obtained, the step length must therefore alternate continuously between 7 and 9 in the upper diagram.

In the lower diagram of FIG. 3, the slide is first shifted to the right by nine container positions as can be seen in the second line of the diagram, and then by seven container positions in the third line. The person skilled in the art will easily see that this rhythm of step lengths alternating between $z=9*d$ and $z=7*d$ must be maintained so that each container in the row will be filled. It should also be noted that the containers numbered 2, 4, 6, 8 in the lower diagram and 2, 4, 6 in the upper diagram are not filled, and that therefore the row of continuously filled containers does begin until containers 7 and 9. The few containers which remain empty at the start of production can be sorted out later on.

The exemplary embodiments shown in the drawings show that, depending on the number of filling units, it is necessary to select a uniform or alternating step width z to ensure that the throughput of the filling unit remains at a constant high level.

FIG. 4 is a schematic diagram of another embodiment of the method for filling a plurality of containers in cycles according to the invention, wherein the number of filling units is odd and their first spacing is equal to three times the second spacing between the containers: $y=3*d$. Thus every third container is filled, and the travel distance is reduced again by a corresponding amount.

The containers 3 may also be arranged a certain distance apart in the first conveyor device 5. Even though the first conveyor device 5 described here has been described as being a slide 6 with a traveling belt 15, any other type of simpler first conveyor device 5 can be provided, as long as it supplies the containers 3 in cycles, one-by-one, to the filling positions.

The present invention has created an improved method and an improved device for filling a plurality of containers in cycles, which method and device are robust in design, relatively simple, and not susceptible to breakdown.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for filling in cycles a plurality of containers (3) at a predetermined number (x) of stationary filling units ($F_1$, $F_2$, ..., $F_x$) arranged in a row with a first spacing (y) from each other, comprising:
   (a) providing a plurality of positively guided containers (3) in a row, one-by-one, wherein the containers (3) have a second uniform spacing (d) from each other, and wherein the first spacing (y) of the individual filling units ($F_1$, $F_2$, ..., $F_x$) is a whole-number multiple of the second spacing (d) of the containers (3), wherein the whole-number multiple is greater than one,
   (b) filling a predetermined number (x) of the containers (3) simultaneously at the filling units ($F_1$, $F_2$, ..., $F_x$)
   (c) shifting the containers (3) in cycles along the filling units ($F_1$, $F_2$, ..., $F_x$) in a transport direction by a step length (z), which is a whole-number multiple of the second spacing (d) of the containers (3) and which is shorter than a third spacing ($(x-1)*y$) between a first filling unit ($F_1$) and a last filling unit ($F_x$), and
   (d) repeating steps (b) and (c) over a predetermined number of iterations.

2. The method according to claim 1, wherein the number (x) of filling units ($F_1$, $F_2$, ..., $F_x$) is odd, and the step length (z) is equal to the second spacing (d) of the containers (3) multiplied by the number (x) of filling units ($F_1$, $F_2$, ..., $F_x$).

3. The method according to claim 1, wherein the number (x) of filling units ($F_1$, $F_2$, ..., $F_x$) is even, and the step length (z) is equal, in alternation, to
   the second spacing (d) of the containers (3) multiplied by the number (x) of filling units ($F_1$, $F_2$, ..., $F_x$) minus 1, and
   the second spacing (d) of the containers (3) multiplied by the number (x) of filling units ($F_1$, $F_2$, ..., $F_x$) plus 1,
in this or the reverse order.

4. A device for filling in cycles a plurality of containers (3), positively guided one-by-one and arranged with a uniform second spacing (d) from each other, with pharmaceutical products, wherein the device comprises:
   a predetermined number (x) of stationary filling units ($F_1$, $F_2$, ..., $F_x$) arranged in a row and with a first spacing (y) with respect to each other, wherein the first spacing (y) of the individual filling units ($F_1$, $F_2$, ..., $F_x$) is a whole-number multiple of the second spacing (d) of the containers (3), and wherein the whole-number multiple is greater than one;
   a first conveyor device (5) for moving the containers (3) in cycles along the filling units ($F_1$, $F_2$, ..., $F_x$) in a transport direction by a step length (z), which is a whole-number multiple of the second spacing (d) of the containers (3) and which is smaller than a third spacing ($(x-1)*y$) between a first filling unit ($F_1$) and a last filling unit ($F_x$); and
   a control unit (7) configured for controlling, in a coordinated manner, the filling of the containers (3) and the movement of the containers (3) in cycles by the step length (z) by means of the first conveyor device (5).

5. The device according to claim 4, wherein the number (x) of filling units ($F_1$, $F_2$, ..., $F_x$) is odd, and the step width (z) is equal to the second spacing (d) of the containers (3) multiplied by the number (x) of filling units ($F_1$, $F_2$, ..., $F_x$).

6. The device according to claim 4, wherein the number (x) of filling units ($F_1$, $F_2$, ..., $F_x$) is even, and the step width (z) is equal to, in alternation,
   the second spacing (d) of the containers (3) multiplied by the number (x) of filling units ($F_1$, $F_2$, ..., $F_x$) minus 1, and
   the second spacing (d) of the containers (3) multiplied by the number (x) of filling units ($F_1$, $F_2$, ..., $F_x$) plus 1,
in this or the reverse order.

7. The device according to claim 4, further comprising a second (11) and a third (13) conveyor device for a continuous, positively guided movement of the containers (3), each of which comprises at least one screw conveyor (9), wherein the second conveyor device (11) transfers the containers (3) to the first conveyor device (5) and the third conveyor device (13) accepts the containers (3) from the first conveyor device (5).

8. The device according to claim 7, wherein the first conveyor device (5) comprises a slide (6), which, during a filling operation, moves slowly via a translational movement in a direction opposite the transport direction and then, for a cycled movement of the containers (3), moves faster in the transport direction over a distance equal to less than half the step length (z).

9. The device according to claim 8, wherein a movement of the containers (3) around the slide (6) is combined under control of the control unit (7) with the translational movement of the slide (6).

10. The device according to claim 9, wherein the first conveyor device (5) comprises an endless belt (15) with drivers (17), the belt being deflected around belt pulleys (19), which are mounted on the slide (6).

11. The device according to claim 9, wherein, both in a first transfer area between the second (11) and the first conveyor device (5) and in a second transfer area between the first (5) and the third conveyor device (13), a respective star wheel (21) with holders for a positively guided reversal of direction of the individual containers (3) is arranged.

* * * * *